United States Patent
Wang et al.

(10) Patent No.: US 7,862,271 B2
(45) Date of Patent: Jan. 4, 2011

(54) FRICTION STIR RIVET METHOD OF JOINING

(75) Inventors: Pei-Chung Wang, Troy, MI (US); Robin Stevenson, Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1110 days.

(21) Appl. No.: 11/532,962

(22) Filed: Sep. 19, 2006

(65) Prior Publication Data

US 2007/0116538 A1 May 24, 2007

Related U.S. Application Data (63) Continuation-in-part of application No. 10/997,473, filed on Nov. 24, 2004, now abandoned.

(60) Provisional application No. 60/592,048, filed on Jul. 29, 2004.

(51) Int. Cl.
*F16B 13/04* (2006.01)
*B23K 20/12* (2006.01)
*B32B 7/02* (2006.01)

(52) U.S. Cl. .................... 411/34; 228/112.1; 29/524.1; 29/522.1; 428/213

(58) Field of Classification Search .................... 411/34; 228/112.1, 2.1; 29/522.1, 524.1; 428/213, 428/457
See application file for complete search history.

(56) References Cited

U.S. PATENT DOCUMENTS

| | | | |
|---|---|---|---|
| 3,038,626 A | 6/1962 | Simmons | 29/243.522 |
| 3,292,482 A | 12/1966 | Fry et al. | 411/43 |
| 3,489,056 A | 1/1970 | Blakeley | 411/41 |
| 3,657,957 A * | 4/1972 | Siebol | 411/70 |
| 3,772,957 A * | 11/1973 | Newton | 411/15 |
| 4,137,817 A | 2/1979 | Siebol | 411/43 |

(Continued)

FOREIGN PATENT DOCUMENTS

DE 1750560 3/1971

(Continued)

OTHER PUBLICATIONS http://www.efunda.com/materials/alloys/stainless_steels/stainles.cfm?

(Continued)

*Primary Examiner*—Victor Batson
*Assistant Examiner*—David Reese (57) ABSTRACT

A method of joining workpieces includes rotating a friction stir rivet via a mandrel and driving the rivet into the workpieces causing frictional heating between the rivet and the workpieces and causing the materials of the workpieces to soften, thereby providing a fiction stirred displaceable path for the rivet to traverse, and driving the rivet along the displaceable path until the rivet mandrel pierces through the workpieces and a cap of the rivet is seated against the workpieces. Subsequent to seating the cap, further rotation of the mandrel is stopped and the workpieces are allowed to cool and harden. An axial load is then applied to the mandrel sufficient to provide mechanical loading between the rivet body and the workpieces. A resultant volume of displaced material from the workpieces is fixedly attached to the workpieces, thereby avoiding the creation of a potentially detachable slug of the displaced material.

6 Claims, 9 Drawing Sheets

U.S. PATENT DOCUMENTS

| | | | |
|---|---|---|---|
| 4,236,429 A | 12/1980 | Dolch | 411/41 |
| 4,407,619 A | 10/1983 | Siebol | 411/43 |
| 4,473,714 A | 9/1984 | Brownell et al. | 174/78 |
| 4,702,655 A | 10/1987 | Kendall | 411/43 |
| 4,781,501 A | 11/1988 | Jeal et al. | 411/43 |
| 4,907,922 A | 3/1990 | Jeal et al. | 411/43 |
| 5,030,050 A | 7/1991 | Auriol et al. | 411/38 |
| 6,004,086 A | 12/1999 | Gand et al. | 411/38 |
| 6,065,918 A | 5/2000 | Adams | 411/29 |
| 6,254,324 B1 | 7/2001 | Smith et al. | 411/34 |
| 6,398,472 B1* | 6/2002 | Jones | 411/34 |
| 6,572,007 B1 | 6/2003 | Stevenson et al. | 228/112.1 |
| 6,637,995 B1* | 10/2003 | White | 411/339 |
| 6,640,414 B2 | 11/2003 | Stevenson et al. | 29/525.14 |
| 6,676,007 B2 | 1/2004 | Stevenson et al. | 228/112.1 |
| 6,702,535 B1 | 3/2004 | Stevenson et al. | 411/82 |
| 6,729,531 B2* | 5/2004 | Stevenson et al. | 228/112.1 |
| 6,729,820 B2 | 5/2004 | Kuo | 411/43 |
| 6,769,595 B2 | 8/2004 | Stol et al. | 228/112.1 |
| 6,779,707 B2* | 8/2004 | Dracup et al. | 228/112.1 |
| 6,883,699 B2* | 4/2005 | Stevenson et al. | 228/112.1 |
| 6,892,924 B2* | 5/2005 | Stevenson et al. | 228/2.1 |
| 6,905,060 B2* | 6/2005 | Van Aken et al. | 228/112.1 |
| 6,905,296 B2 | 6/2005 | Millington | 411/48 |
| 2003/0218053 A2* | 11/2003 | Litwinski et al. | 228/112.1 |
| 2006/0175381 A1* | 8/2006 | Wang et al. | 228/112.1 |
| 2006/0236739 A1 | 10/2006 | Smith et al. | 72/67 |
| 2006/0251489 A1* | 11/2006 | Denham et al. | 411/34 |
| 2007/0116538 A1 | 5/2007 | Wang et al. | 411/60.1 |

FOREIGN PATENT DOCUMENTS

EP     1 503 089 B1     2/2005

OTHER PUBLICATIONS http://www.precisionsteel.com/products/default.asp?n_cat_id=3&prod_id=306.

Machine Translation of DE1750560; Publication Date: Mar. 25, 1971; Applicant: Holtkamp Gerhard Dipl-Ing; Huelsmann Werner; pp. 1-5.

* cited by examiner

FRICTION STIR RIVET METHOD OF JOINING

CROSS REFERENCE TO RELATED APPLICATIONS

This application is a continuation-in-part application of U.S. application Ser. No. 10/997,473, filed Nov. 24, 2004, now abandoned, which claims the benefit of U.S. Provisional Application Ser. No. 60/592,048, filed Jul. 29, 2004, both of which are incorporated herein by reference in their entirety.

BACKGROUND OF THE INVENTION

The present disclosure relates generally to friction stir riveting and a method of joining therewith, and particularly to a friction stir rivet and method that has a reduced tendency to undesirably displace softened friction stirred material sideways into the joint between the workpieces being joined.

Friction stir welding (FSW) is a method used to join metal workpieces that generally uses a cylindrical shouldered tool with a profiled pin that is rotated at the joint line between two workpieces while being traversed along the joint line. The rotary motion of the tool generates frictional heat that serves to soften and plasticize the workpieces. As the pin moves laterally, the softened material, contributed by both workpieces, intermingles in the wake of the traversing pin and cools and hardens due to the absence of further frictional stirring, creating a bond between the two workpieces.

Recent advances in friction stir processes have extended the FSW technique to friction stir riveting (FSR), where a stir rivet is rotated and advanced into an arrangement of workpieces to be joined such that the material of the workpieces plasticizes around the rivet during the friction stirring, and then hardens around the rivet when the body of the rivet stops rotating and the workpieces and rivet are allowed to cool.

While present devices and methods may be suitable for their intended purposes, it is desirable to further advance the technology of friction stir riveting in a manner that offers opportunities for joining dissimilar materials.

BRIEF DESCRIPTION OF THE INVENTION

Embodiments of the invention include a friction stir rivet for use in a friction stir process. The rivet includes a body, a mandrel, and a mechanical interface between the body and the mandrel. The body has an elongated shank, a cap at a first end, and an axial hole therethrough. The mandrel has an elongated shaft defining an axis and a head at one end thereof, the head having an effective outside diameter greater than the effective outside diameter of the shaft, the shaft being disposed within the axial hole of the body, the mandrel head being disposed at an opposite end of the body to that of the cap, and the end of the mandrel head having a substantially pointed surface aligned with the axis of the shaft. At least one of the body and the mandrel is configured to engage with the other to provide a rotational inhibitor such that axial rotation of the mandrel is capable of causing axial rotation of the body, and vice versa.

Other embodiments of the invention include a method of joining upper and lower workpieces fluidly bondable at a point of engagement using the aforementioned friction stir rivet. The rivet is positioned at the point of engagement of the workpieces, and the mandrel is rotated about its rotational axis. The rivet is driven toward and into the workpieces such that resultant frictional heating between the rivet and the workpieces causes the materials of the workpieces to soften at a process temperature thereby providing a friction stirred displaceable path for the rivet to traverse. The rivet is driven along the displaceable path until the substantially pointed surface of the mandrel pierces through the workpieces and the cap is seated against the workpieces. Further rotation of the mandrel is stopped, allowing the workpieces and mandrel to cool below the process temperature, thereby permitting the softened workpieces to harden. The mandrel is axially loaded with sufficient force to drive the mandrel head into the end of the body thereby upsetting and expanding the body end to create an interference between the body and the underside of the lowermost workpiece and to cause the mandrel shaft to sever at a point internal to the body and proximate the cap. As a result, the workpieces are held together by the fluidly bonded materials of the workpieces, the differential thermal contraction of the workpieces and the rivet, and the mechanical loading between the mandrel and the body, at the point of engagement. A resultant volume of displaced material from the workpieces is fixedly attached to the workpieces, thereby avoiding the creation of a potentially detachable slug of the displaced material

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention discloses a friction stir rivet having an outer body and an inner mandrel with a mechanical interface therebetween to inhibit rotational and translational motion of one independent of the other, such that the outer body rotates in response to the mandrel being rotated, and the outer body translates in the axial direction of translation of the mandrel. The mandrel has a flat head that engages the workpieces to be joined, thereby providing a friction stir surface that has a reduced tendency to undesirably displace the softened friction stirred material sideways in the joint between the workpieces. Other embodiments disclose a method of joining two or more workpieces using the friction stir rivet disclosed herein, and doing so in the absence of a preexisting hole in the workpieces to be joined.

Figure 1:
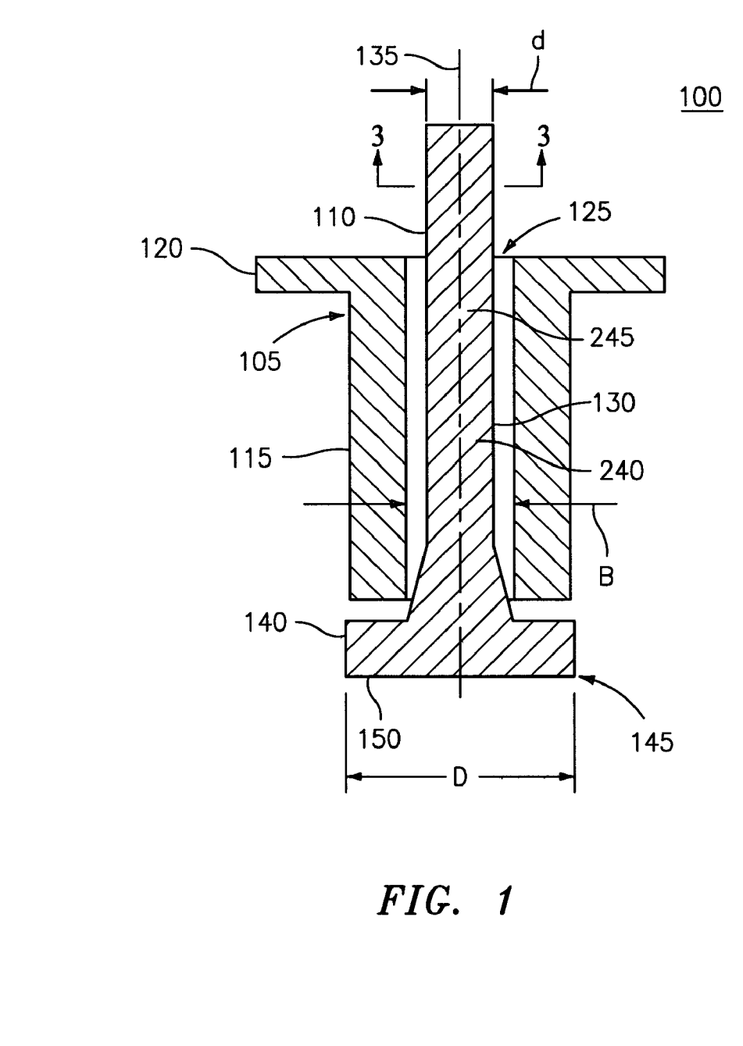
FIGS. 1 and 2 depict in cross section longitudinal view exemplary rivets in accordance with embodiments of the invention.

FIG. 1 depicts a cross section view of an exemplary embodiment of a friction stir rivet 100 having a body 105 and a mandrel 110. Body 105 has an elongated cylindrical shank 115, a cap 120 at one end, and an axial hole 125 extending from one end to the other. Mandrel 110 has an elongated shaft 130 defining an axis 135, and a head 140 at one end. Head 140 has an effective outside diameter D that is greater that the effective outside diameter d of shaft 130.

Figure 3:
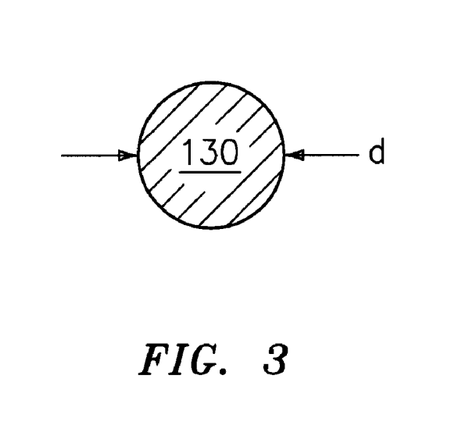
FIGS. 3-5 depict in cross section axial view exemplary shafts of a mandrel of a rivet for use in embodiments of the invention.
Figure 4:
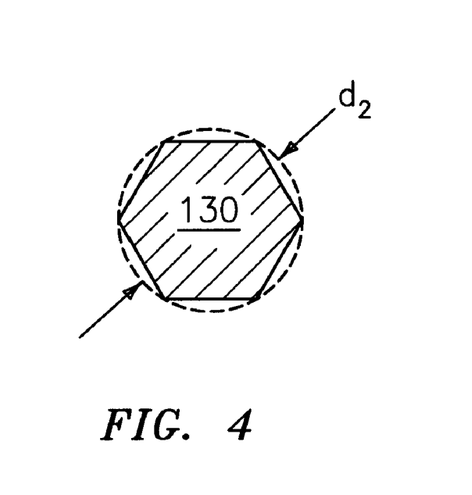
Figure 5:
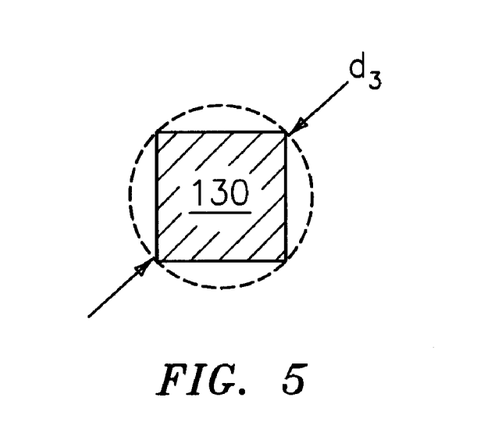

As used herein, the term effective diameter refers to that diameter that the respective cross section would transcribe if it were rotated about its axis of rotation, such as axis 135 in the case of shaft 130. For example, and referring now to FIGS. 3-5 which depict exemplary cross section cuts through shaft 130, a shaft 130 having a circular cross section would have an effective diameter defined by its own diameter d (see FIG. 3), a shaft 130 having a hexagonal cross section would have an effective diameter defined by d2 (see dashed line, FIG. 4), and a shaft 130 having a square cross section would have an effective diameter defined by d3 (see dashed line, FIG. 5). While only shaft 130 is depicted in FIGS. 3-5, it will be appreciated that the same configuration may be applied to both the mandrel head 140 and the body shank 115. That is, a circular mandrel shaft 130 may be used with a circular body shank 115, a hexagonal mandrel shaft with a hexagonal body shank, and a square mandrel shaft with a square body shank, for example. In an embodiment where shaft 130 of mandrel 110, and at least an internal portion of the shank 115 of body 105, are non-circular, the outer and inner surfaces, respectively, may provide a mechanical interface therebetween, thereby resulting in the rotation of shank 115 and body 105 in response to mandrel 110 being rotated. Also, while only three cross section geometries are depicted in FIGS. 3-5, it will be appreciated that rivet 100 is not so limited and that any cross section geometry may be applied to rivet 100 in accordance with embodiments of the invention.

Figure 2:
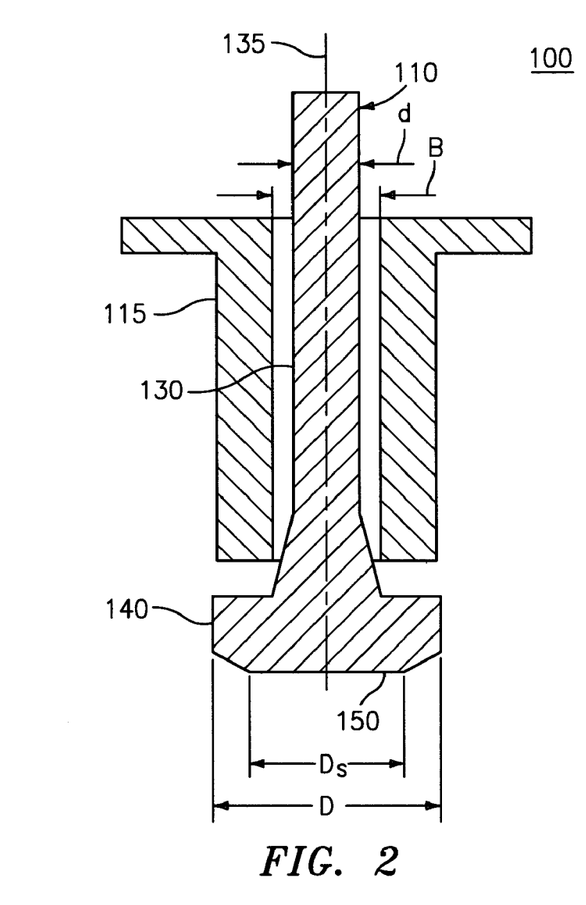

As depicted in FIG. 1, shaft 130 is disposed within axial hole 125, and head 140 is disposed at the opposite end of body 105 to that of cap 120. In an embodiment, the end 145 of mandrel head 140 has a flat surface 150 that is oriented substantially perpendicular to axis 135 of shaft 130, and preferably flat surface 150 is oriented substantially perpendicular to axis 135 within plus-or-minus two degrees of axis 135. While it is desirable to have flat surface 150 extend over about 100% of the effective diameter D of the end 145 of mandrel head 140, it may also be possible to have and use flat surface 150 that extends over something less than 100% of effective diameter D. In an alternative embodiment, and referring now to FIG. 2, flat surface 150 may have an effective outside diameter Ds that is less than the effective outside diameter D of mandrel head 140. For example, flat surface 150 may have an effective outside diameter Ds that is equal to or greater than about 80% of the effective outside diameter D of mandrel head 140. Notwithstanding the foregoing, it has been observed that the closer effective diameter Ds is to effective diameter D, the less the tendency will be to displace the softened friction stirred material sideways into the joint between the workpieces.

Figure 6:
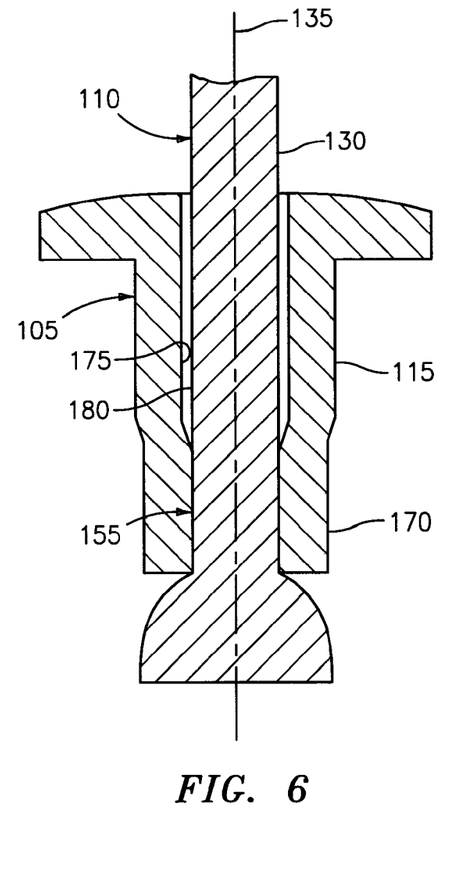
FIGS. 6 and 7 depict in cross section longitudinal view alternative exemplary rivets in accordance with embodiments of the invention.
Figure 7:
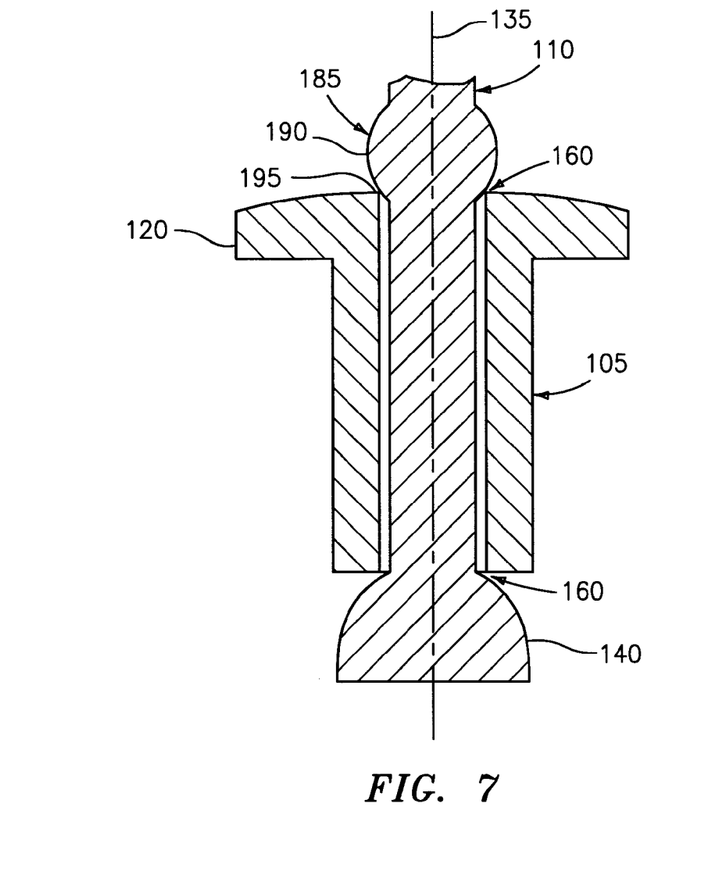
Figure 8:
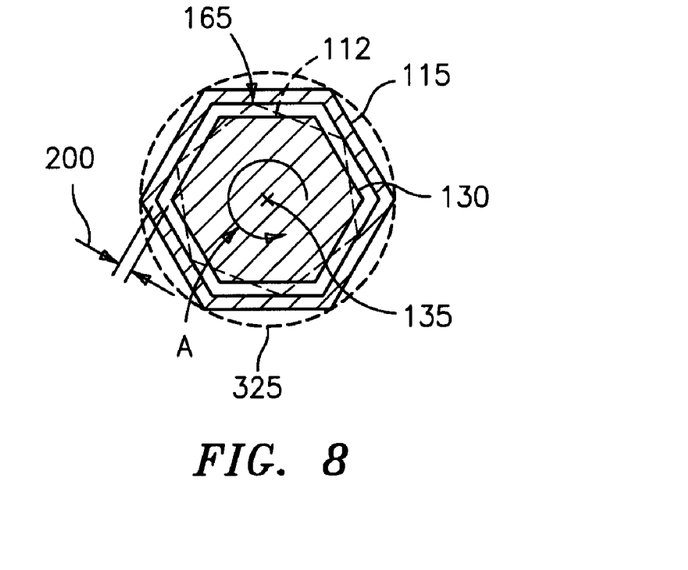
FIGS. 8 and 9 depict in cross section axial view alternative exemplary rivet geometries having a non-circular cross section in accordance with embodiments of the invention.
Figure 9:
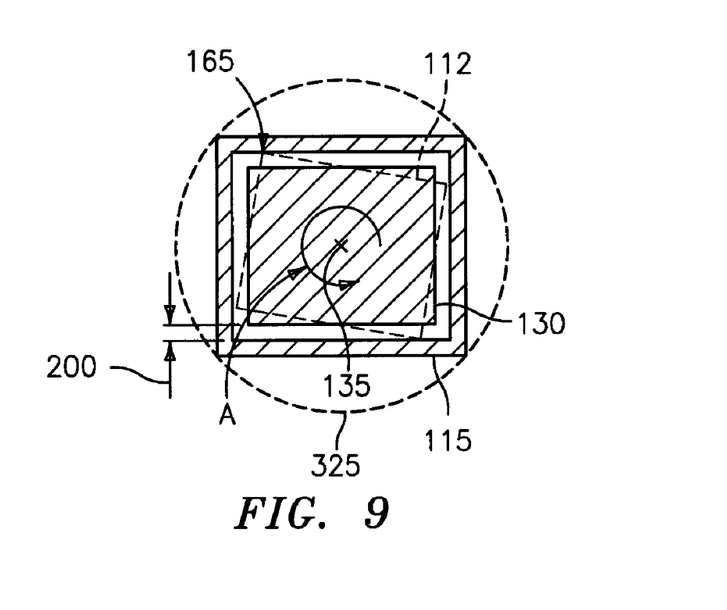

A mechanical interface 155, 160, 165, best seen by now referring to FIGS. 6-9, between body 105 and mandrel 110 of FIGS. 6 and 7, and between shaft 130 and shank 115 of FIGS. 8 and 9, enables body 105 and shank 115 to rotate in response to the rotation of mandrel 110 and shaft 130. FIGS. 6 and 7 depict section cuts containing axis 135 similar to that of FIGS. 1 and 2, and FIGS. 8 and 9 depict section cuts perpendicular to axis 135 similar to that of FIGS. 4 and 5. Alternatively, as depicted in FIGS. 8 and 9, dashed circular lines 325 represent a circular geometry to the external surface of shank 115 while the internal surface, or at least a portion of the internal surface, of shank 115 is configured to match the non-circular geometry of the shaft 130 of mandrel 110.

Referring first to FIG. 6, body 105 includes a deformed region 170 such that inner surface 175 of shank 115 is compressed against outer surface 180 of shaft 130, thereby forming mechanical interface 155. The compressive force at interface 155 is made sufficient to cause body 105 to rotate in response to mandrel 110 being rotated. In an embodiment, deformed region 170 is created by a crimping operation, or any other mechanical upsetting operation.

Figure 19:
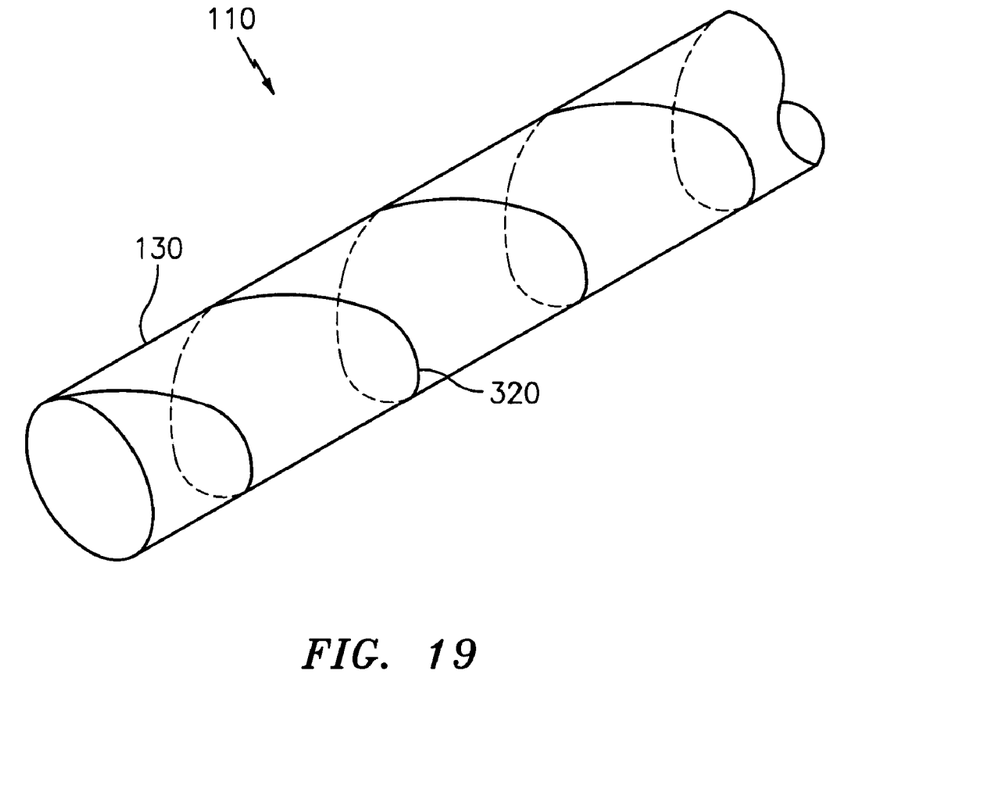
FIG. 19 depicts a portion of an alternative mandrel of the friction stir rivet of FIGS. 1 and 2 in accordance with an embodiment of the invention.

An alternative or additive mechanical interface includes a surface treatment applied either to the outer surface 180 of the shaft 130 of mandrel 110, to the inner surface 175 of the shank 115 of body 105, or to both, such that rotation of the shank 115 and body 105 results in response to rotation of the mandrel 110, and axial translation of the shank 115 and body 105 results in response to axial translation of the mandrel 110. Such a mechanical interface may be viewed as providing a rotational inhibitor, a translational inhibitor, or both, meaning that one of the parts is inhibited from rotating or translating without the other. In an embodiment, the surface treatment may be obtained by knurling, spiral thread rolling, serrating with lateral and longitudinal upsets, chemical etching, or any other process suitable for the purposes disclosed herein. An exemplary spiral thread rolling surface treatment 320 applied to the shaft 130 of mandrel 110 is depicted in FIG. 19. However, it will be appreciated that the surface treatment could also be applied to the inside of the shank 115. As one skilled in the art would appreciate, any surface treatment disposed and configured to provide frictional and/or mechanical interference in both the circumferential and the longitudinal directions relative to the shaft 130 and shank 115 would provide both a rotational inhibitor and a translational inhibitor for the purposes disclosed herein.

Referring now to FIG. 7, mandrel 110 includes a deformed, upset or flared region 185 such that outer surface 190 of deformed region 185 is compressed against inner edge 195 of cap 120 during a friction stir riveting operation. In an alternative embodiment, deformed region 185 and head 140 form a tight fit between top and bottom of body 105, thereby tightly gripping and constraining body 105 during a friction stir riveting operation. In either embodiment of FIG. 7, mechanical interfaces 160 may result. The degree of interference at interfaces 160 is made sufficient to cause body 105 to rotate in response to mandrel 110 being rotated during a friction stir riveting operation.

Referring now to FIGS. 8 and 9, shaft 130 of mandrel 110, and shank 115 of body 105, each have matching non-circular cross sections perpendicular to axis 135 that define an annulus 200 therebetween, such that the outer surface of shaft 130 engages the inner surface of shank 115 in response to rotation (arrow A) of mandrel 110 about axis 135, thereby forming mechanical interface 165, best seen by referring to the phantom lines 112 of each figure, which represent a rotated mandrel 110.

In an alternative embodiment, the material and outside diameter d of shaft 130 and the material and inside diameter B of shank 115 are selected and sized such that diameter d is less than diameter B during assembly, and at least one of the shaft and shank are at a temperature other than ambient temperature during assembly. For example if both shank 115 and mandrel 110 are fabricated of substantially the same material, then their coefficients of thermal expansion will be substantially equal so that the relative scale of the shank inner diameter and the mandrel outer diameter will be maintained when both are at the same temperature, whether that temperature is greater than, less than or equal to ambient temperature. Thus, for example, a shank 115 and mandrel 110 that cannot be assembled at any one temperature, cannot be assembled at any other temperature if both shank 115 and mandrel 110 are maintained at identical temperatures, and conversely, a shank 115 and mandrel 110 that can be assembled at any one temperature, will be capable of assembly at any other temperature if both are maintained at identical temperatures. However, by conducting assembly under conditions where a temperature differential exists between shank 115 and mandrel 110, it is possible to selectively modify the dimensions of one relative to the other, such that they may be assembled while ensuring that an interference will be established and maintained when both are at identical temperatures, which may range from ambient temperature to the process temperature. For example the shank 115 may be heated to expand its inner diameter such that it exceeds the outer diameter of the mandrel 110 at some reduced temperature, or the mandrel 110 may be cooled such that its outside diameter is reduced below that of the inner diameter of the shank 115 at some elevated temperature. A further alternative embodiment may be employed when the shank 115 and mandrel 110 are of differing materials each with an associated thermal expansion coefficient. In this case, by appropriately selecting the applicable ambient temperature dimension of the shank 115 and mandrel 110 to ensure interference, a uniform temperature may be found where assembly is possible due to the differing increase or decrease of these dimensions as the temperature is raised. For example, without restricting the range of materials that could be employed or suggesting that these materials are preferred, the thermal expansion coefficient of iron is about 66% of the thermal expansion coefficient of copper, and about 50% that of aluminum. Thus the expansion or contraction of these materials when exposed to the same temperature excursion would be significantly different leading to the possibility that a shank 115 and mandrel 110 fabricated of dissimilar materials that did not assemble at ambient temperature could be assembled at some different temperature and, on returning the assembly to a temperature that lay between ambient temperature and the process temperature, exhibit the frictional or mechanical interference described previously. In an embodiment where the workpieces are aluminum, the process temperature is arranged to be less than or equal to about 660 deg-C., for example, and in an embodiment where the workpieces are thermoplastic, the process temperature is arranged to be less than the melt temperature of the respective thermoplastic. In this manner, a thermal expansion compression fit between shaft 130 and shank 115 at the appropriate process temperature will produce the desired mechanical interface between shaft 130 and shank 115 such that shank 115 and body 105 will rotate in response to the rotation of mandrel 110 and shaft 130.

Whether the shank 115 and shaft 130 of mandrel 110 are made from the same or different materials, it will be appreciated from the foregoing that an interference fit, the aforementioned mechanical interference, may be achieved by thermal contraction and expansion, or vice versa, of one or both parts.

In an embodiment, mandrel 110 and body 105 are selected to be copper, titanium, iron, or any alloy having at least one of the foregoing materials. If mandrel 110 is steel, it is preferable to use medium or high carbon steel. As used herein, medium carbon steel refers to a steel having equal to or greater than about 0.29 weight % carbon and equal to or less than about 0.54 weight % carbon, and high carbon steel refers to a steel having equal to or greater than about 0.55 weight % carbon and equal to or less than about 0.95 weight % carbon.

Figure 10:
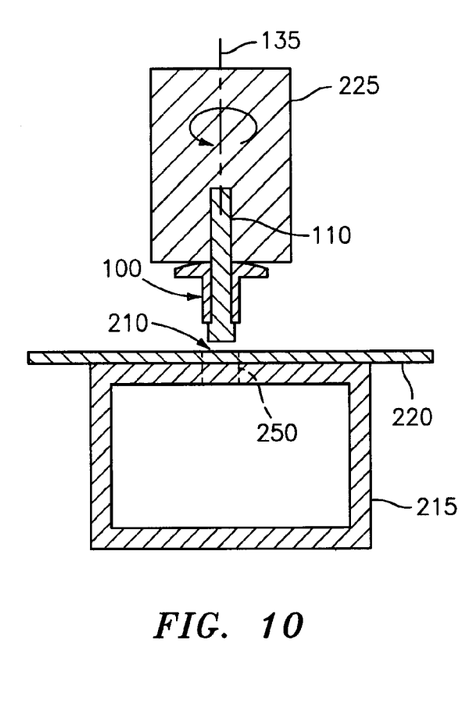
FIGS. 10-12 depict a riveting method in accordance with embodiments of the invention.
Figure 11:
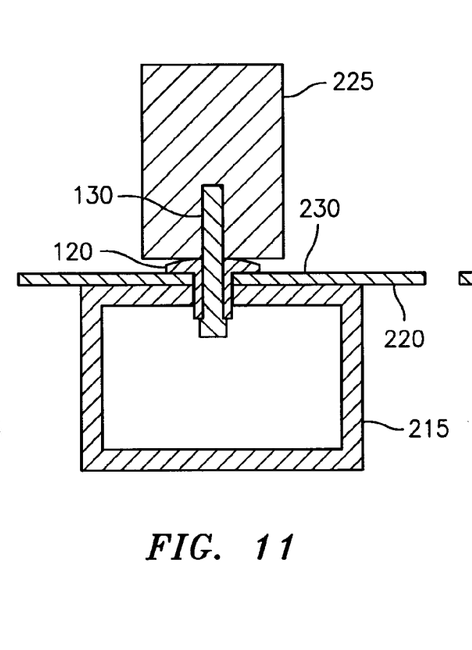
Figure 12:
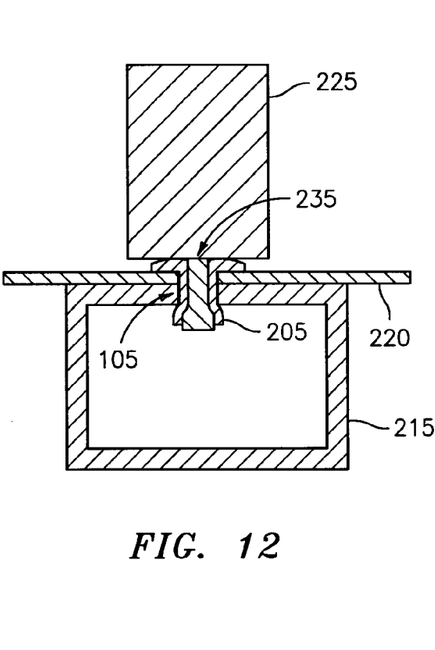

The materials used for mandrel 110 and body 105 are selected such that head 140 of mandrel 110 is strong enough to deform the end 205 of body 105 in response to head 140 being axially pulled into hole 125 of body 105 subsequent to the friction stirring process, best seen by now referring to FIGS. 10-12, which depict an exemplary method of friction stir riveting in accordance with embodiments of the invention.

In FIG. 10, workpiece 215 is supported in an appropriate fashion, workpiece 220 is positioned on top of workpiece 215, friction stir rivet 100 is positioned at the point of engagement 210 of the workpieces 215, 220, and mandrel 110 is rotated about its rotational axis 135 via a rotary drive tool 225. In FIG. 11, tool 225 has driven rivet 100 downward towards and into workpieces 220 and 215 in a rotary fashion such that resultant frictional heating between rivet 100 and workpieces 220, 215 causes the materials of workpieces 220, 215 to soften, thereby providing a friction stirred displaceable path (depicted generally as numeral 250) for rivet 100 to traverse. Rivet 100 is driven along the displaceable path until cap 120 is seated against the top surface 230 of workpiece 220. While it may be possible to rotate and drive rivet 100 at sufficient speed and rate to cause melting of workpieces 220, 215, it has been observed that rotating and driving rivet 100 to cause softening of workpieces 220, 215 is sufficient for producing a suitable joint. In an embodiment, tool 225 rotates mandrel 110 at a speed of about 12,000 revolutions per minute (rpm), and drives rivet 100 downward at a rate of equal to or greater than about 6 millimeters per minute (mm/min) and equal to or less than about 900 mm/min. However, it is contemplated that rotational speeds of equal to or less than about 12,000 rpm may be suitable for the purposes disclosed herein. An exemplary drive rate of about 12 mm/min was applied using 2024-T3 aluminum workpieces 220, 215. As a result of the rotation speed in combination with the drive rate, the friction heating initiated between the end 140 of mandrel 110 and the surface 230 of workpiece 220, a friction stir process temperature is established that results in the softening of workpieces 220 and 215, and preferably but not necessarily results in softening without melting. As discussed previously, the process temperature is that temperature between ambient temperature and the melt temperature of workpieces 220, 215 at which workpieces 220, 215 are soft enough to provide a displaceable friction stir path for rivet 100 to traverse. In an embodiment, the process temperature is substantially less than the melt temperature of rivet 100.

In an embodiment, and with reference still to FIG. 11, tool 225 drives rivet 100 toward workpieces 220, 215 until the underside of cap 120 is in loaded contact with the topside surface 230 of workpiece 220, resulting in friction stirring and partial penetration of cap 120 into surface 230, holds the 12,000 rpm rotation of mandrel 110 for a defined period of time, such as two seconds for example, and then stops further rotation to allow workpieces 220, 215 and mandrel 110 to cool below the process temperature. During the cooling, the softened workpieces 220, 215 harden.

In an alternative embodiment, tool 225 holds the 12,000 rpm rotation of mandrel 110 for a defined period of time subsequent to the underside of cap 120 being seated against the topside surface 230 of workpiece 220, and then stops further rotation to allow workpieces 220, 215 and mandrel 110 to cool below the process temperature.

Subsequent to hardening, and with reference now to FIG. 12, tool 225 applies an axial tensile load (pulling operation) to mandrel 110 with sufficient force to drive mandrel head 140 into end 205 of body 105, deform end 205 in an upsetting like operation, and cause mandrel shaft 130 to sever at a location 235 internal to body 105 and proximate cap 120. As a result, workpieces 220, 215 are held together by the fluidly bonded materials of the workpieces 220, 215, the differential thermal contraction of the workpieces 220, 215 and the rivet 100, and the mechanical loading between mandrel 110 and body 105 and between body 105 and workpieces 220, 215, at the point of engagement 210.

To assist in the severing of shaft 130 during the pulling operation, an embodiment of shaft 130 includes a first region 240 of relatively high tensile strength and a second region 245 of relatively low tensile strength, depicted in FIG. 1 but also applicable to other embodiments of shaft 130 depicted in FIGS. 2, 6, 7, and 10-12. In an embodiment, the first and second regions 240, 245 of relatively high and low tensile strength are achieved by differing the cross section area of shaft 130 in the two regions. Second region 245 is proximate cap 120, thereby resulting in a substantial amount of shaft 130 remaining within body 105 after being severed, which adds to the strength of the resultant riveted joint. It has been observed in an embodiment that by causing a portion of mandrel 110 to be retained within body 105, the joint strength is improved by about a factor of two compared to the same joint absent the portion of mandrel 110.

In an embodiment, and as previously discussed, end 145 of mandrel 110 is flat to within plus-or-minus two degrees of perpendicular relative to axis 135, where flat surface 150 has an effective diameter at about 100% of the effective diameter of head 140. The use of flat surface 150 provides an effective way of initiating and generating frictional heating as the rotating flat surface 150 of mandrel 110 is driven into workpieces 220, 215, and the use of a 100% flat surface 150 provides an effective way of reducing the tendency for the displaced material along the displaceable path to penetrate the region between workpieces 220, 215 at the faying surfaces as rivet 100 is driven into and through workpieces 220, 215.

Figure 13:
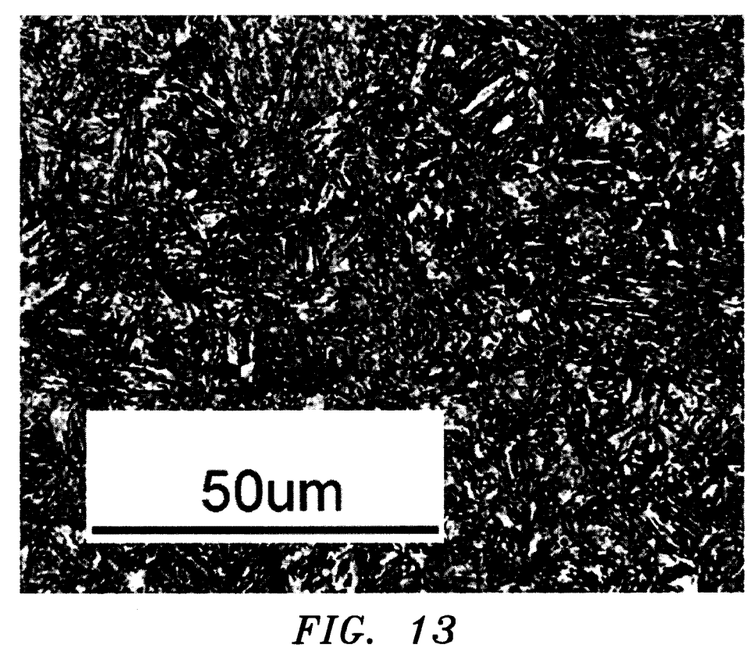
FIG. 13 depicts a martensite microstructure for use in accordance with embodiments of the invention.
Figure 14:
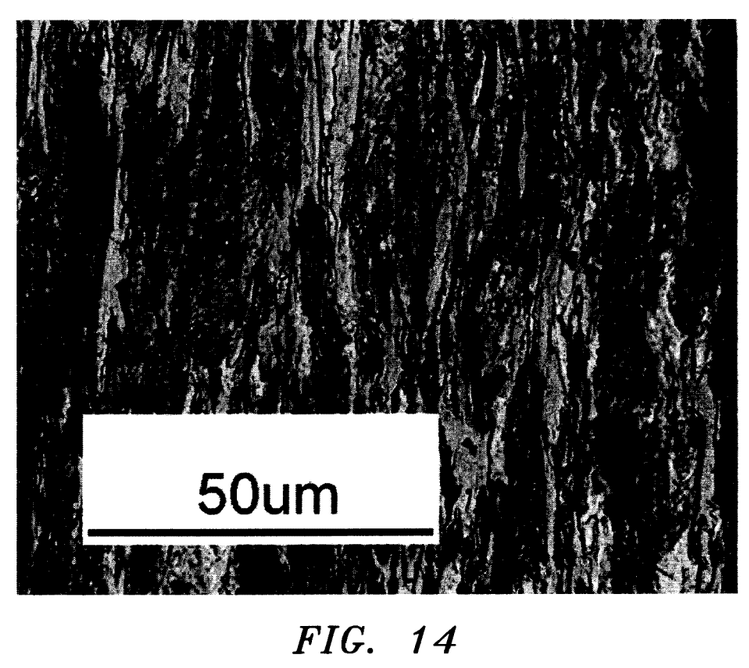
FIG. 14 depicts a cold drawn microstructure for use in accordance with embodiments of the invention.

Due to the elevated temperatures (process temperature) associated with friction stir riveting, it is desirable to use a material for the mandrel 110 that can withstand the elevated temperatures without substantially losing tensile strength qualities during the duration of the riveting process. Metallurgical hardening processes, such as transformation hardening or workhardening, generally develop microstructures which, due to diffusional processes, degrade upon exposure to elevated temperatures. The mandrel 110, is designed to upset the body 105 of the rivet 100 before severing. To maintain this capability after friction stir riveting, the mandrel should be strengthened using a process that will substantially maintain mandrel strength under the temperature-time history experienced by the mandrel during the friction stir riveting process. Ideally this would entail that the mandrel tensile strength be unaffected by the time-temperature history of the riveting process, but less stringent requirements may be imposed provided that the operational requirement of upsetting before severing is satisfied. Since the degree of softening is influenced by the initial choice of strengthening mechanism, the maximum temperature experienced, and the time during which the mandrel 110 is exposed to the process temperature, the softening behavior of the mandrel 110 under the time-temperature history to which it is exposed should be taken into consideration. Thus, for example, a mandrel 110 with a tempered martensite structure, such as is shown in FIG. 13, would generally be preferred over a cold drawn mandrel, such as is shown in FIG. 14, since the tempered martensite mandrel has already been subjected to a short-term elevated temperature excursion during the tempering process, while the cold drawn structure has not. Thus, the cold drawn structure would be expected to soften more than the tempered martensite structure under identical riveting process conditions. As used herein, the term short-term temperature excursion refers to a temperature at or below the process temperature for a period of time equal to or less than about two minutes. As depicted, FIGS. 13 and 14 are magnified views of the respective material microstructure, with a scale of 50 um (micro-meters) also shown.

In an embodiment, a suitable material for mandrel 110 is a medium carbon steel, such as having 0.40 weight % carbon for example, that is quenched to form martensite, and is then tempered at a temperature of not less than about 450 deg-C. for not less than about 30 minutes, and is preferably tempered at a temperature of not less than about 500 deg-C. for not less than about 30 minutes.

In another embodiment, a suitable material for mandrel 110 is a material that undergoes a change in tensile strength in response to the friction stir process, which may involve an elevated temperature at the process temperature for the period of hold time, that is equal to or less than about 5% change, and preferably is equal to or less than about 1% change.

In a further embodiment, a suitable material for mandrel 110 is a material that can withstand a process temperature of equal to or greater than about 50% and equal to or less than about 100% of the highest melt temperature of metallic workpieces 220, 215, at a process time of equal to or less than about two minutes, such that the end 205 of body 105 is upset prior to second region 245 being severed during the pulling process.

In yet another embodiment, a suitable material for mandrel 110 is a material that can withstand a process temperature of equal to or greater than the highest glass transition temperature and equal to or less than the highest melt temperature of polymeric workpieces 220, 215, at a process time of equal to or less than about two minutes, such that the end 205 of body 105 is upset prior to second region 245 being severed during the pulling process.

In yet a further embodiment having dissimilar materials for workpieces 220, 215, such as a polymeric upper workpiece 220 and a metallic lower workpiece 215 for example, a suitable material for mandrel 110 is a material that can withstand the higher of the aforementioned process temperatures for polymeric 220 and metallic 215 workpieces, respectively.

While some manufacturing processes may be desirous of short friction stir hold cycles, such as the aforementioned two seconds for example, other manufacturing processes may prefer longer hold cycles, such as one minute or two minutes for example. With a two second or longer hold cycle, it is contemplated that the use of a martensite or bainite microstructure for mandrel 110 will result in a stronger rivet 100 as compared to a rivet 100 having a mandrel 110 with a cold drawn microstructure.

However, it will be appreciated that overall production process cycles may be sensitive to the drive rate of the friction stir riveting process, with a faster drive rate being preferred, and that a faster drive rate may result in lower temperatures for less time, and consequently less annealing of the mandrel, thereby enabling mandrel materials, such as cold drawn microstructures for example, to endure the desired time-temperature process parameters of the friction stir riveting process. Accordingly, and under certain conditions, a cold drawn microstructure for the material of mandrel 110 may be suitable for the purposes disclosed herein.

From the foregoing, it will be appreciated that a suitable material for mandrel 110 is not limited to martensite, bainite, or any other specific microstructure, but is rather determined by the resultant material characteristics of the mandrel 110 subsequent to exposure to the process parameters of time and temperature.

In accordance with embodiments of the invention, 3 mm thick workpieces 220 and 215 made of 5052 aluminum have been successfully joined. However, it is contemplated that embodiments of the invention also offer opportunities for joining dissimilar materials including but not limited to composites to aluminum, polymers to aluminum, and aluminum to magnesium. For composite to aluminum or polymer to aluminum joints, it is contemplated that the aluminum be mounted below the composite or polymer so that the expanding rivet during the pulling operation may engage the aluminum as it is expanded by head 140 of mandrel 110, while the composite or polymer is held by the larger rivet cap 120 of body 105, and thus subjected to a lower, less localized stress.

Figure 15:
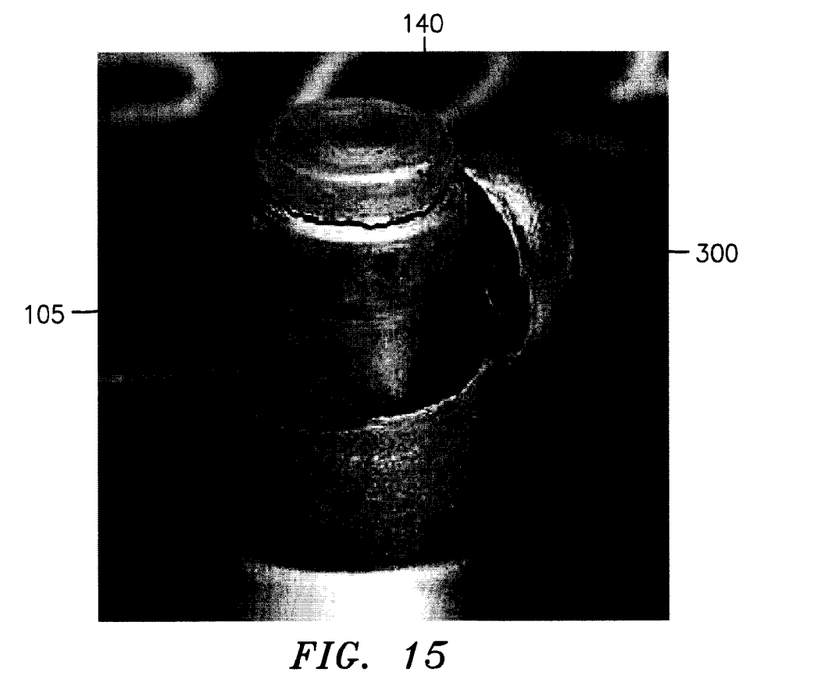
FIG. 15 is a digital image that illustrates an intermediate step of a friction stir riveting process employing a rivet similar to that of FIG. 1 in accordance with an embodiment of the invention.

While the foregoing detailed description and discussion of the various figures has demonstrated the utility of a friction stir rivet 100 having a mandrel head 140 with a flat surface 150, it has been observed that such a friction stir rivet 100 and friction stir riveting process, depicted illustratively in FIGS. 10-12, tends to result in slug 300 (see FIG. 15 for example) of displaced material that has the potential of detaching, through vibration or otherwise, at some time subsequent to the friction stir riveting process. As depicted in FIG. 15, the potentially detachable slug 300 of displaced material is the result of the flow front of the displaceable path being thinned and pushed to the side as the mandrel head 140 and body 105 pierce through the workpieces 215, 220. While the potentially detachable slug 300 of displaced material is not viewed as being harmful, it nonetheless may become a nuisance if it detaches from the workpieces behind a hidden panel and is now free to rattle if the panel is subjected to vibration, such as may be the case if the panel is part of a vehicle that is being driven on a not-so-smooth road. To negate the creation of a potentially detachable slug 300 of displaced material, an alternative embodiment of the invention includes a rivet with a mandrel having a head with a substantially pointed surface aligned with the axis of the mandrel shaft, which is best seen by now referring to FIG. 16.

Figure 16:
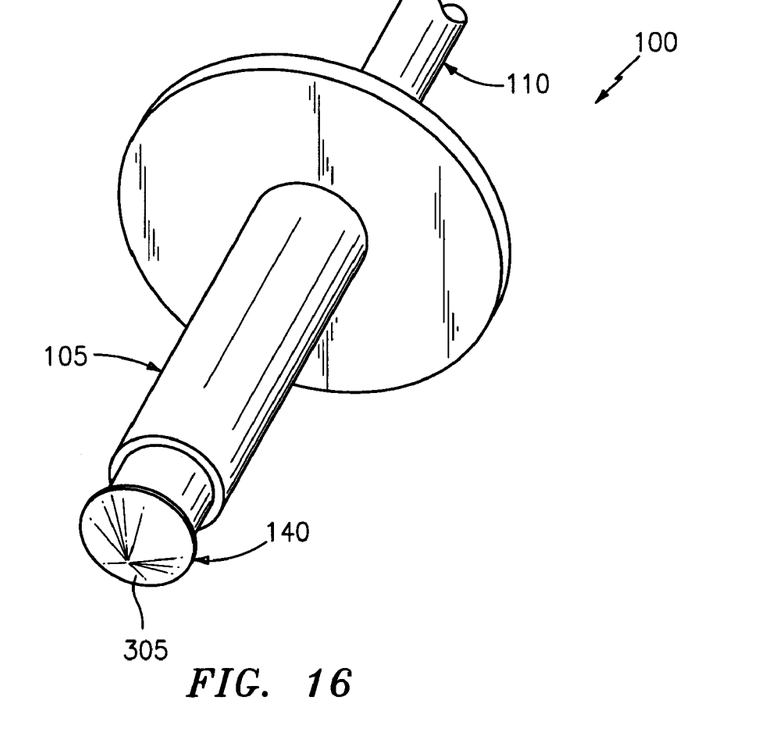
FIG. 16 depicts a friction stir rivet alternate to the rivet depicted in FIG. 1 and in accordance with an embodiment of the invention.

With reference now to FIG. 16, the friction stir rivet 100 is similar in structure to that described above with the exception of the mandrel head 140 having a substantially pointed surface 305 aligned with the axis of the mandrel shaft. As used herein, the term substantially pointed refers to a surface having a sharp point, a dull point, a rounded point, a flattened point, a semi-hemispherical shape, or any other non-pointed tip suitable for the purposes disclosed herein, for example. In an embodiment, the substantially pointed surface 305 has a non-pointed tip having a cross-section at the transition point that is no more than about 10% of the effective outside diameter of the mandrel head, such as may be the case with a flattened point, for example. However, the scope of the invention is not limited to a flattened point where the percent of flatness is no more than 10% of the effective outside diameter of the mandrel head as long as the friction stir rivet 100 performs as disclosed herein with regard to the absence of a slug 300 being created. In an embodiment, the substantially pointed surface 305 is conical in shape with an included angle a, which is best seen by referring to FIG. 17. In an embodiment, the included angle a is about 100-degrees. However, it will be appreciated that the included angle may be other than 100-degrees as long as the friction stir rivet 100 performs as disclosed herein with regard to the absence of a slug 300 being created.

Figure 18:
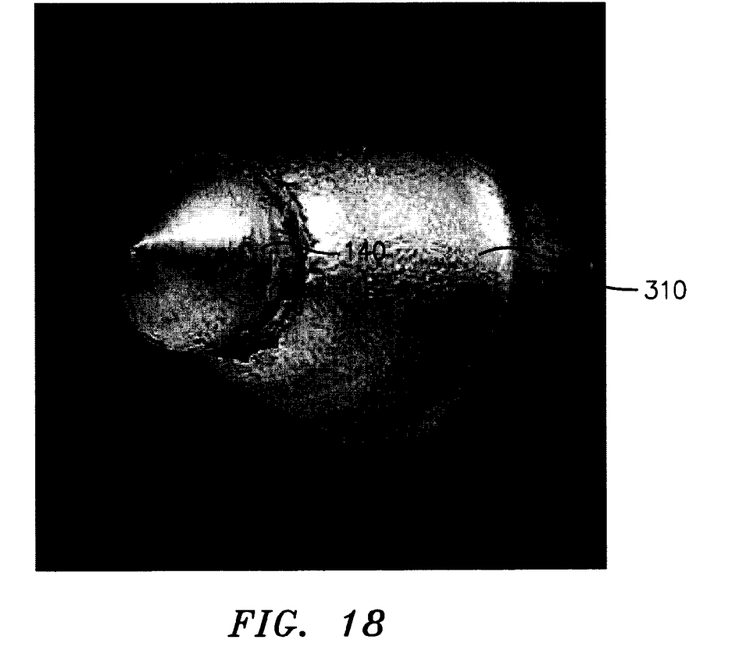
FIG. 18 is a digital image that illustrates an intermediate step of a friction stir riveting process employing a rivet similar to that of FIG. 16 in accordance with an embodiment of the invention.

Referring now to FIG. 18, experimental results have shown that the friction stir rivet 100 with a mandrel head 140 having a conically shaped substantially pointed surface 305 with an included angle a of about 100-degrees, provides for a friction stir process wherein a resultant volume of displaced material 310 from the workpieces is fixedly attached to the workpieces, thereby avoiding the creation of a potentially detachable slug (such as slug 300 depicted in FIG. 15) of the displaced material.

Figure 17:
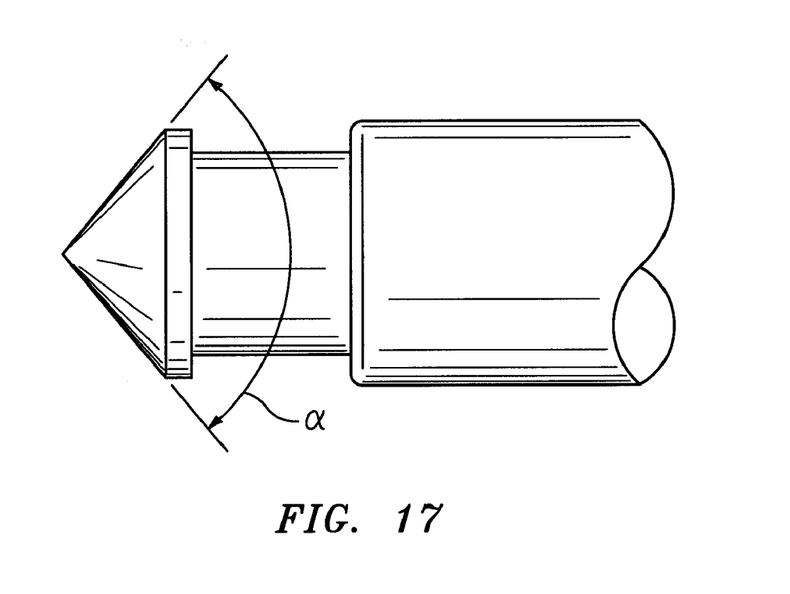
FIG. 17 depicts a portion of the rivet depicted in FIG. 16.

When performing a friction stir riveting process employing the aforementioned friction stir rivet depicted in FIGS. 16-18, the mandrel, and the substantially pointed surface of the mandrel, is rotated and driven toward and into the workpieces such that resultant frictional heating between the rivet and the workpieces causes the materials of the workpieces to soften at a process temperature thereby providing a friction stirred displaceable path for the rivet to traverse, and the rivet is driven along the displaceable path until the substantially pointed surface of the mandrel pierces through the workpieces and the cap is seated against the workpieces. Further rotation of the mandrel is stopped as discussed previously to allow the workpieces and mandrel to cool below the process temperature, thereby permitting the softened workpieces to harden. Further process steps are as described above, with the exception that a resultant volume of displaced material from the workpieces is fixedly attached to the workpieces, thereby avoiding the creation of a potentially detachable slug of the displaced material.

As disclosed, some embodiments of the invention may include some of the following advantages: the ability to join workpieces together in the absence of a preexisting hole, thereby minimizing clearance, tolerance, fit-up and alignment issues, particularly for multi-member stack-ups; improved flow control of the displaced material that reduces its tendency to penetrate the joint area between the workpieces, thereby reducing the likelihood of the displaced material forcing the workpieces apart as it cools and hardens, leaving a large gap therebetween; the opportunity for friction stir riveting dissimilar materials; and, the ability to friction stir workpieces together in the absence of creating a potentially detachable slug of displaced material.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of joining upper and lower workpieces fluidly bondable at a point of engagement, the method comprising:

positioning a fiction stir rivet at the point of engagement of the workpieces, the rivet comprising: a body having an elongated shank, a cap at a first end, and an axial hole therethrough, a mandrel having an elongated shaft defining an axis and a head at one end thereof, the head having an effective outside diameter greater than the effective outside diameter of the shaft, the shaft being disposed within the axial hole of the body, the mandrel head being disposed at an opposite end of the body to that of the cap, and the end of the mandrel head having a substantially pointed surface aligned with the axis of the shaft, and a mechanical interface between the body and the mandrel, wherein at least one of the body and the mandrel is configured to engage with the other to provide a rotational inhibitor such that axial rotation of the mandrel is capable of causing axial rotation of the body;

rotating the mandrel about its rotational axis and causing rotation of the body, driving the rivet such that the substantially pointed surface of the mandrel is driven toward and into the workpieces such that resultant frictional heating between the rivet and the workpieces causes the materials of the workpieces to soften at a process temperature that is substantially lower than the melting temperature of the rivet thereby providing a fiction stirred displaceable path for the rivet to traverse, and driving the rivet along the displaceable path until the substantially pointed surface of the mandrel pierces through the workpieces and the cap is seated against the workpieces;

stopping further rotation of the mandrel and allowing the workpieces and mandrel to cool below the process temperature, thereby permitting the softened workpieces to harden; and axially loading the mandrel with sufficient force to drive the mandrel head into the end of the body thereby upsetting and expanding the body end to create an interference between the body and the underside of the lowermost workpiece and to cause the mandrel shaft to sever at a point internal to the body and proximate the cap, thereby resulting in the workpieces being held together by the fluidly bonded materials of the workpieces, the differential thermal contraction of the workpieces and the rivet, and the mechanical loading between the mandrel and the body, at the point of engagement;

wherein a resultant volume of displaced material from the workpieces is fixedly attached to the workpieces, thereby avoiding the creation of a potentially detachable slug of the displaced material.

2. The method of claim 1, wherein the rotating comprises:
rotating the mandrel at equal to or less than about 12,000 revolutions per minute.

3. The method of claim 1, wherein the driving comprises:
driving the rivet at a rate equal to or greater than about 6 millimeters per minute and equal to or less than about 900 millimeters per minute.

4. The method of claim 1, wherein the resultant frictional heating is initiated by the friction stir interaction between the substantially pointed surface of the mandrel and the workpieces.

5. The method of claim 1, wherein the driving the rivet into the workpieces comprises:
driving the rivet absent a preexisting hole in the workpieces.

6. The method of claim 1, further comprising:
driving the rivet along the displaceable path until the underside of the cap is in loaded contact with one of the workpieces, and subsequent thereto, friction stirring and partially penetrating the cap into the one of the workpieces.

\* \* \* \* \*